(12) United States Patent
Ragusa et al.

(10) Patent No.: US 9,156,628 B2
(45) Date of Patent: Oct. 13, 2015

(54) SORT SYSTEMS AND METHODS (71) Applicant: UNITED PARCEL SERVICE OF AMERICA, INC., Atlanta, GA (US)

(72) Inventors: Louis Ragusa, Riverside, CT (US); James Cossey, Snellville, GA (US)

(73) Assignee: UNITED PARCEL SERVICE OF AMERICA, INC.

( * ) Notice: Subject to any disclaimer, the term of this patent is extended or adjusted under 35 U.S.C. 154(b) by 0 days.

(21) Appl. No.: 14/695,407

(22) Filed: Apr. 24, 2015

(65) Prior Publication Data

US 2015/0225182 A1    Aug. 13, 2015

Related U.S. Application Data (63) Continuation of application No. 14/474,890, filed on Sep. 2, 2014, now Pat. No. 9,043,013, which is a continuation of application No. 13/614,904, filed on Sep. 13, 2012, now Pat. No. 8,843,231.

(60) Provisional application No. 61/533,941, filed on Sep. 13, 2011.

(51) Int. Cl.
*G06F 7/00*      (2006.01)
*B65G 47/50*     (2006.01)

(52) U.S. Cl.
CPC ..................................... *B65G 47/50* (2013.01)

(58) Field of Classification Search
None
See application file for complete search history.

(56) References Cited

U.S. PATENT DOCUMENTS

2004/0016684 A1 *   1/2004   Braginsky et al. ............ 209/702
2009/0319401 A1 *  12/2009   Rao et al. ........................ 705/29

* cited by examiner

*Primary Examiner* — Yolanda Cumbess
(74) *Attorney, Agent, or Firm* — Alston & Bird LLP (57) ABSTRACT

Embodiments of the present invention provide systems and methods for assisting sort operators in identifying the appropriate location to sort an item. In accordance with one aspect of the invention, a system for identifying a particular bin from a plurality of bins for sorting a package is provided. The system includes a plurality of bins configured to receive sorted packages; an optical reader positioned to capture destination indicia associated with the package; a keypad comprising a plurality of keys, where in at least some of the keys are associated with individual bins of the plurality of bins and at least some of the keys include lights; and a control system. The control system is configured to: receive data from the optical reader relating to the destination indicia; identify a particular bin within the plurality of bins associated with the received data; and trigger illumination of one or more lights on the keypad.

16 Claims, 7 Drawing Sheets

SORT SYSTEMS AND METHODS

CROSS-REFERENCE TO RELATED APPLICATIONS

This application is a continuation of U.S. patent application Ser. No. 14/474,890, filed on Sep. 2, 2014, which is a continuation of U.S. patent application Ser. No. 13/614,904, filed on Sep. 13, 2012 and now issued as U.S. Pat. No. 8,843,231, which claims priority to U.S. Patent Application No. 61/533,941, which was filed on Sep. 13, 2011. All of these applications are incorporated herein in their entirety by reference.

BACKGROUND OF THE INVENTION

In common carrier settings, an often-encountered obstacle is training a newly hired employee to sort packages into a number of bins based on the destination of the packages. For instance, in particular carrier facilities, employees may be required to sort packages that may be destined to anywhere in the United States. Normally, it may take weeks of studying postal codes and taking tests until a new employee is proficient enough to be given the responsibility of sorting. Therefore, a need exists in the art to provide a system and method for facilitating the sorting proficiency of an employee without having to take part in such lengthy training.

BRIEF SUMMARY OF THE INVENTION

In general, embodiments of the present invention provide systems and methods for assisting sort operators in identifying the appropriate location to sort an item. In accordance with one aspect of the invention, a system for identifying a particular bin from a plurality of bins for sorting a package is provided. The system includes a plurality of bins configured to receive sorted packages; an optical reader positioned to capture destination indicia associated with the package; a keypad comprising a plurality of keys, where in at least some of the keys are associated with individual bins of the plurality of bins and at least some of the keys include lights; and a control system. The control system is configured to: receive data from the optical reader relating to the destination indicia; identify, based at least in part on the received data, a particular bin within the plurality of bins to which the package is to be sorted; and trigger illumination of one or more lights on the keypad associated with the particular bin.

In accordance with another aspect of the invention, a method for identifying a particular bin within a plurality of bins for sorting a package is provided. The method includes the steps of: providing a plurality of bins configured to receive sorted packages; providing a keypad comprising a plurality of keys, where in at least some of the keys are associated with individual bins of the plurality of bins and at least some of the keys include lights; capturing destination indicia from the package; determining a particular bin within the plurality of bins to which the package should be sorted based at least in part on the captured destination indicia; and triggering illumination of one or more lights on the keypad.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

I. Methods, Apparatus, Systems, and Computer Program Products

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

II. Exemplary System Architecture

Figure 1:
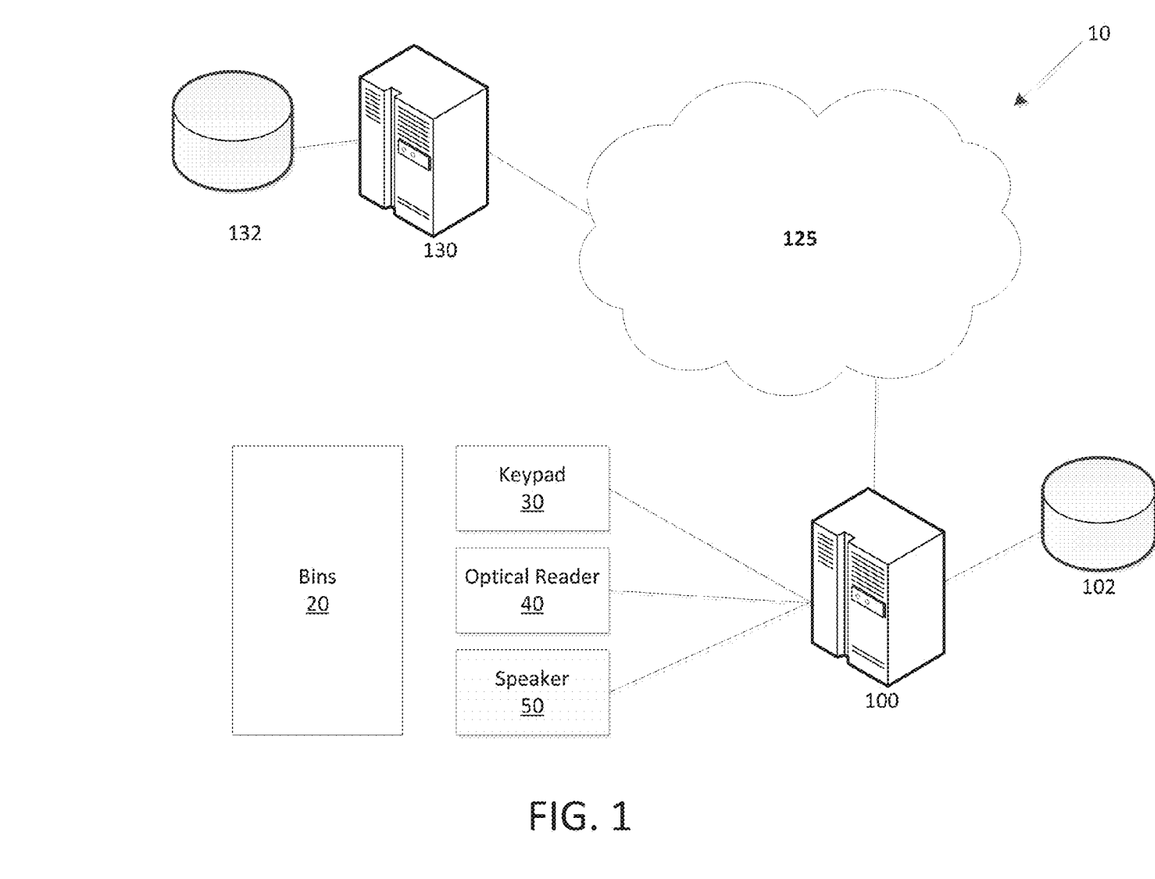
FIG. 1 is a schematic diagram of a sort system in accordance with an embodiment of the present invention.

FIG. 1 provides an illustration of a system that can be used in conjunction with various embodiments of the present invention. As shown in FIG. 1, the system may include a control system 100, a plurality of bins 20, a keypad 30, an optical reader 40, a speaker 50, a carrier system 130, and one or more networks 125. In various embodiments, the control system 100 may be in communication with one or more types of storage media 102. In addition, the control system 100 may include a database management system and the storage media 102 may include one or more databases and one or more database instances (also referred to herein as "data repository"). In various embodiments, the storage media 102 may be one or more types of medium such as hard disks, magnetic tapes, or flash memory. The term "database" refers to a structured collection of records or data that is stored in a computer system, such as via a relational database, hierarchical database, or network database. Similarly, the carrier system 130 may be in communication with one or more types of storage media 132 (also referred to herein as a "data repository") having similar functionality to the storage media 102.

Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture.

1. Exemplary Control System

Figure 2:
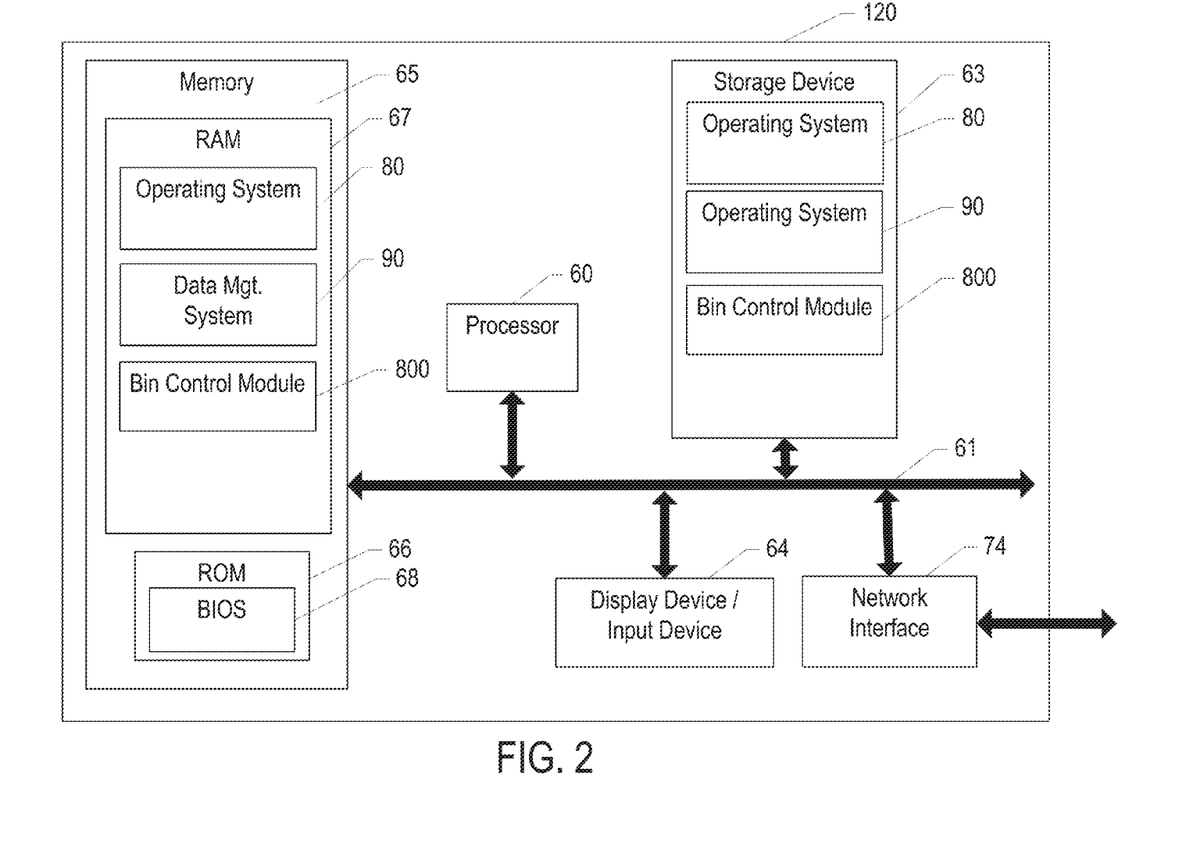
FIG. 2 is a schematic diagram of a control system 100 in accordance with an embodiment of the present invention.

FIG. 2 provides a schematic of a control system 100 according to one embodiment of the present invention. In general, the control system 100 may refer to, for example, any computer, programmable logic control (herein after "PLC"), computing device, mobile phone, desktop, notebook or laptop, distributed system, server, blade, gateway, switch, processing device, or combination of processing devices adapted to perform the functions described herein. However, the control system 100 may also comprise various other systems and their corresponding components.

As will be understood from this figure, in one embodiment, the control system 100 may include a processor 60 that communicates with other elements within the control system 100 via a system interface or bus 61. The processor 60 may be embodied in a number of different ways. For example, the processor 60 may be embodied as one or more processing elements, one or more microprocessors with accompanying digital signal processors, one or more processors without an accompanying digital signal processors, one or more coprocessors, one or more multi-core processors, one or more controls, and/or various other processing devices including integrated circuits such as, for example, an application specific integrated circuit (ASIC), a field programmable gate array (FPGA), a hardware accelerator, and/or the like.

In an exemplary embodiment, the processor 60 may be configured to execute instructions stored in the device memory or otherwise accessible to the processor 60. As such, whether configured by hardware or software methods, or by a combination thereof, the processor 60 may represent an entity capable of performing operations according to embodiments of the present invention when configured accordingly. A display device/input device 64 for receiving and displaying data may also be included in or associated with the control system 100. The display device/input device 64 may be, for example, a keyboard or pointing device that is used in combination with a monitor. The control system 100 may further include transitory and non-transitory memory, which may include both random access memory (RAM) 67 and read only memory (ROM) 65. The server's ROM 65 may be used to store a basic input/output system (BIOS) 68 containing the basic routines that help to transfer information to the different elements within the control system 100.

In addition, in one embodiment, the control system 100 may include at least one storage device 63, such as a hard disk drive, a CD drive, a DVD drive, and/or an optical disk drive for storing information on various computer-readable media. The storage device(s) 63 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like. Additionally, each of these storage devices 63 may be connected to the system bus 61 by an appropriate interface.

Furthermore, a number of program modules may be stored by the various storage devices 63 and/or within RAM 67. Such program modules may include an operating system 80, database management system 90, and a Bin Control Module 800. These modules may control certain aspects of the operation of the control system 100 with the assistance of the processor 60 and operating system 80, although their functionality need not be modularized. In addition to the program modules, the control system 100 may store and/or be in communication with one or more databases.

Also located within and/or associated with the control system 100, in one embodiment, is a network interface 74 for interfacing with various computing entities. This communication may be via the same or different wired or wireless networks (or a combination of wired and wireless networks), as discussed above. For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), and/or any other wired transmission protocol. Similarly, the control system 100 may be configured to communicate via wireless external communication networks using any of a variety of protocols, such as 802.11, GPRS, UMTS, CDMA2000, WCDMA, TD-SCDMA, LTE, E-UTRAN, Wi-Fi, WiMAX, UWB, and/or any other wireless protocol.

It will be appreciated that control system's 100 components may be located remotely from other control system 100 components. Furthermore, one or more of the components may be combined and additional components performing functions described herein may be included in the control system 100.

2. Carrier System

The carrier system 130 may include one or more components that are functionally similar to those of the control system 100. For example, in one embodiment, the computing devices include (a) a processor that communicates with other elements via a system interface or bus, (b) a display device/input device; (c) memory including both RPM and RAM; (d) a storage device; and a network interface. These architectures are provided for exemplary purposes only and are not limiting to the various embodiments. The term "computing device" is used generically to refer to any computer, mobile phone, computing device, desktop, notebook or laptop, distributed system, server, gateway, switch, or other processing device adapted to perform the functions described herein.

3. Exemplary Bins

Figure 3:
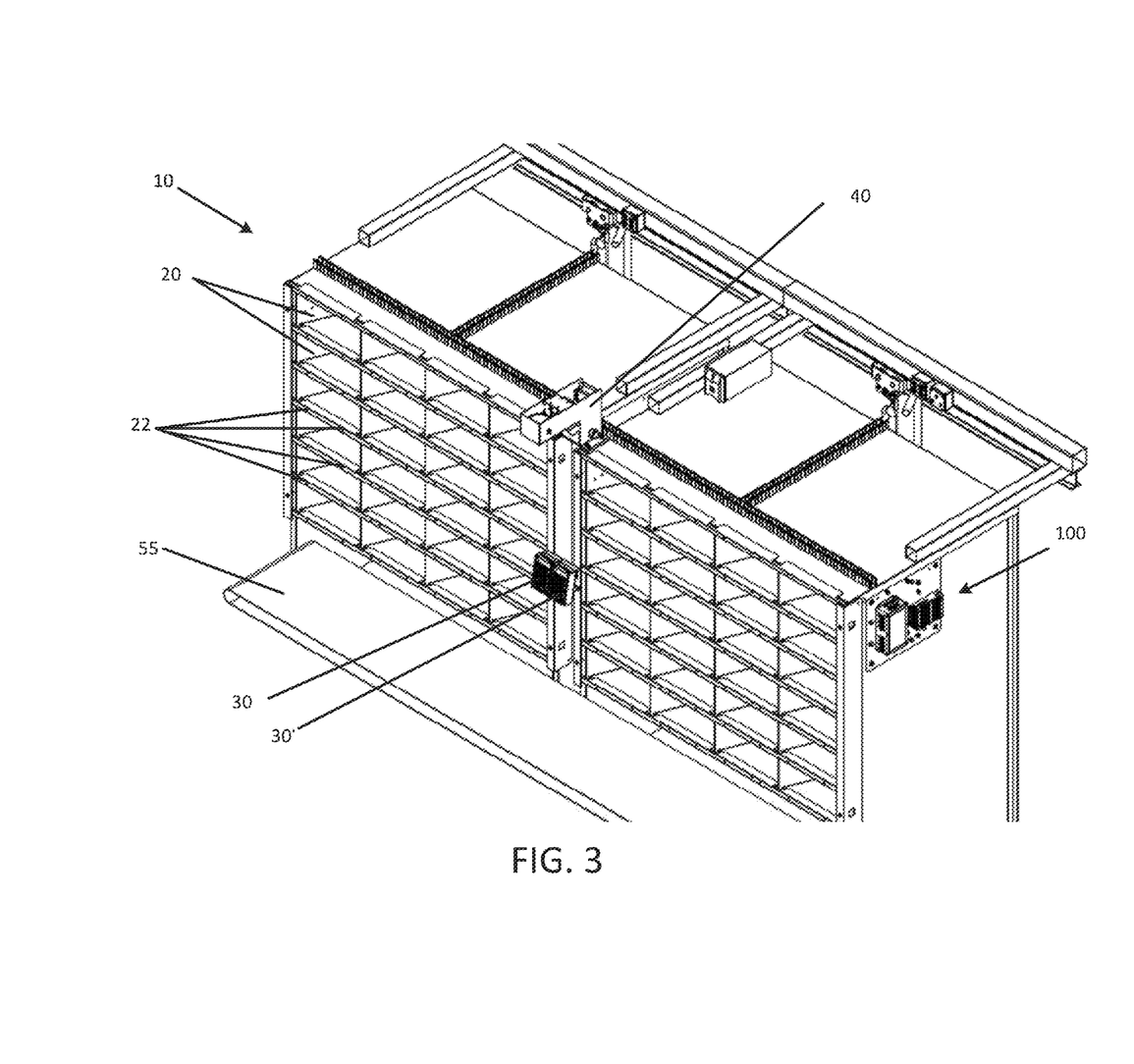
FIG. 3 is a perspective view of the front of sorting bins used in practicing various aspects of the present invention.

As illustrated in FIG. 3, the system may include a plurality of bins 20 into which packages may be sorted. In various embodiments, at least some of the bins 20 include one or more selectively activated visual indicators 22. The visual indicators 22 may be activated to identify the appropriate bin for an individual package. For instance, FIG. 3 illustrates an embodiment in which lights are installed around at least a portion of the perimeter of the bin. These lights may be illuminated to direct the sort operator to the appropriate bin for an individual package. In some embodiments, the lights may be LED lights encased in a protective covering. When a package is destined for a specific bin, a portion of the perimeter of that bin may be illuminated. Other suitable alternatives include fluorescent lamps, light pipes, fiber optics, or a light at each corner of the bin. The activation of the visual indicators may be triggered by the control system 100 (e.g., the Bin Control Module 800).

Figure 4:
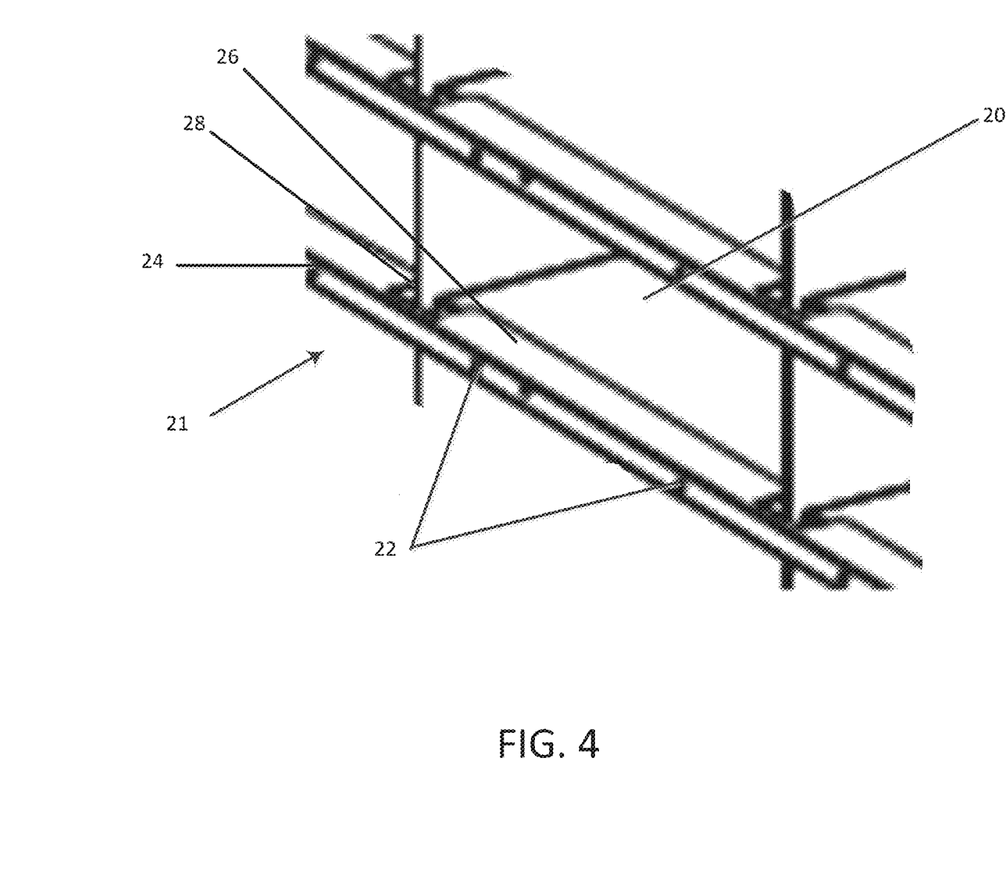
FIG. 4 is an enlarged view of a bin with a visual indication assembly attached thereto in accordance with an embodiment of the present invention.

In addition, it is noted that in particular embodiments, the visual indicators may be designed as an add-on piece that may be installed on an existing bin. For instance, FIG. 4 illustrates a visual indicator assembly 21 that includes visual indicators 22 mounted on a bar 24 that includes a flange 26 to aid in installing on the lip of the bin 20. The visual indicator assembly 21 may extend over more than one bin. In the illustrated embodiment, notches 28 are cut into the flange so that the flange may fit around the walls between the bins. Thus, in particular instances a visual indicator assembly 21 may be used with existing racks of bins, which may help to reduce the cost of installing and of using embodiments of the invention.

Furthermore, in particular embodiments, the combination of the color of the bar 24 and the color of the lights (e.g., visual indicators 22) may aid the sort operator in being able to better identify which bin has been identified for sorting the package. For instance, experimentation with certain combinations of colors has demonstrated that having a configuration of a black bar and blue lights may provide a beneficial combination for aiding the sort operator in identifying the correct bin for sorting the package because such a combination provides good contrast. However, it should be noted that this combination may not be optimal in all situations and/or environments. Therefore, the black/blue combination should not be viewed as limiting the invention, and other color combinations may be used as desired.

In various embodiments, one or more infrared transmitters (not shown) may be installed in the visual indicator assembly placed in the bin 20 so that the transmitters direct an infrared beam across the opening of the bin to one or more infrared detectors installed in a visual indicator assembly on the opposite side of the bin 20 running parallel to the first bar. Thus, in this instance, when the package is placed in the bin, the infrared beam is broken and the detectors detect the break in the beam, which may be communicated to the control system 100 to stop illuminating lights associated with the bin and/or the keypad. This communication may also be used to monitor the number of packages placed in a particular bin.

4. Exemplary Optical Reader

In various embodiments, an optical reader 40 is disposed at a location accessible to a sort operator. FIG. 3 illustrates the optical reader 40 being installed on top of the rack of bins so that the reader is facing down towards the sort operator who is positioned between the rack of bins 20 and the conveyor 55. Of course, the optical reader 40 could be installed in other locations, such as for example proximate the conveyor 50, proximate the middle of the rack of bins, or on a dedicated pedestal.

In various embodiments, the optical reader 40 scans and captures destination indicia found in the form of alpha-numeric characters, barcode, or two-dimensional symbols (such as MaxiCode® symbols) associated with a package either on an associated label or directly on the package. In particular embodiments, a speaker (not shown) may signal to the operator that the destination indicia have been captured. The optical reader communicates the scanned information to the control system 100.

5. Exemplary Keypad

Figure 5:
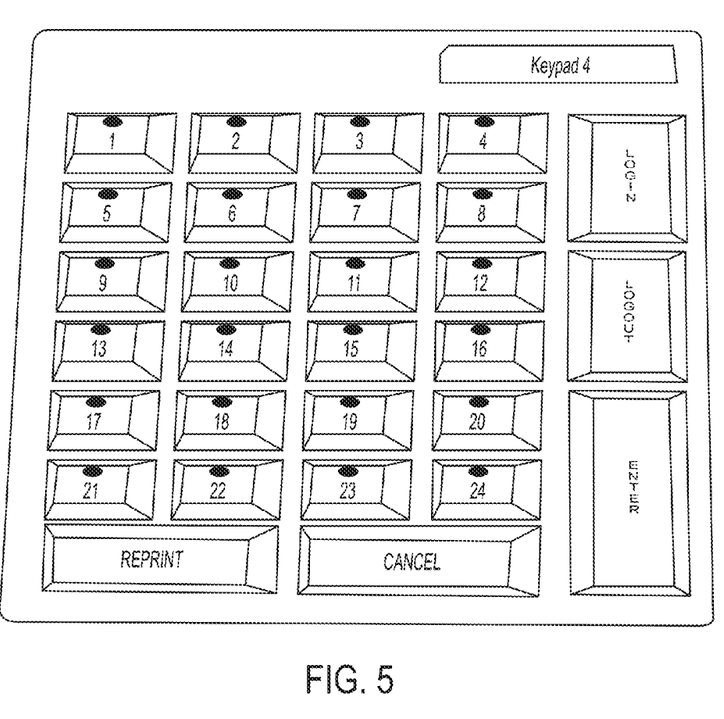
FIG. 5 displays an embodiment of a keypad that may be used in practicing various aspects of the present invention.

FIG. 5 provides a configuration of a keypad 30 that may be used in conjunction with various embodiments of the invention. In the illustrated embodiment, the keypad includes numbered keys, one to twenty-four, where the numbered keys are associated with individual bins. For example, key four represents bin four in the rack of bins. In addition, each numbered key has an associated light. Thus, if the control system 100 determines that a package should be sorted into bin four, the control system 100 will trigger the light associated with key four to be illuminated. This helps direct the sort operator to the correct bin within the rack of bins. In addition, the illustrated keypad also includes an ENTER key that may be used to indicate a package has been sorted, a REPRINT key for reprinting a label, and a CANCEL key for canceling an operation. The keypad also includes LOGIN and LOGOUT keys to enable an operator to login and out of the system.

FIG. 3 illustrates two keypads 30, 30' where keypad 30 is associated with one group of 24 bins (i.e. the group on the left) and keypad 30' is associated with the other group of 24 bins (i.e. the group on the right). Other embodiments may include one or more keypads associated with any number of bins each.

Figure 6:
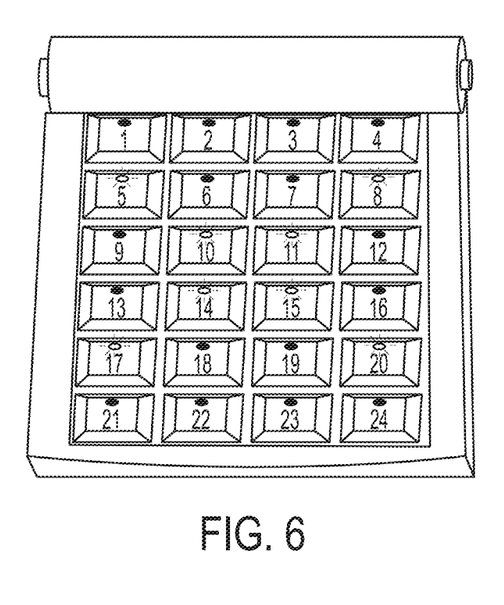
FIG. 6 displays an embodiment of a keypad that may be used in practicing various aspects of the present invention.
Figure 7:
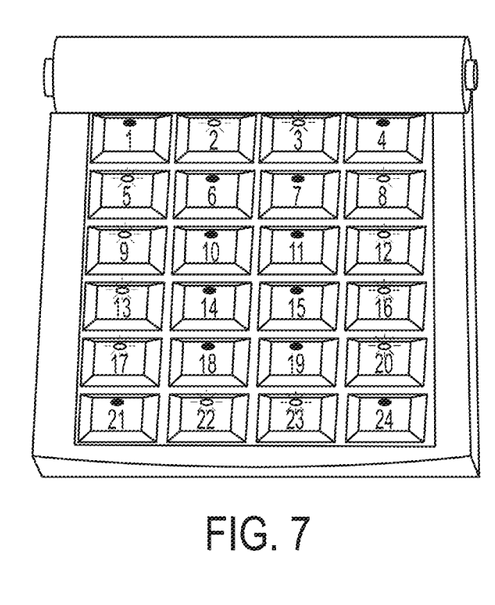
FIG. 7 displays an embodiment of a keypad that may be used in practicing various aspects of the present invention.

FIGS. 6 and 7 provide another possible keypad configuration that includes numbered keys associated with particular bins. Similar to the keypad illustrated in FIG. 5, each key has an associated light and the lights may be illuminated to provide an indication of which bin to sort a package to.

III. Exemplary System Operation

1. Sorting into Appropriate Bins

With reference to FIGS. 1 and 3, various process features will be described in accordance with embodiments of the present invention. The sorting process begins with a sort operator (not shown) selecting a package (not shown) from the conveyor 55 and passing the package under the optical reader 40 installed on the rack of bins 20. In the illustrated embodiment, the optical reader 40 is installed on top of the rack of bins so that the reader is facing down towards the sort operator who is positioned between the rack of bins 20 and the conveyor 55. The package may include a label, and the sort operator passes the package under the optical reader 40 with the label pointing up at the reader. The optical reader 40 scans and captures destination indicia. The scanned indicia may be in the form of alpha-numeric characters, barcode, or two-dimensional symbols (such as MaxiCode® symbols). In particular embodiments, a speaker (not shown) may signal to the operator that the destination indicia have been captured. The optical reader 40 communicates data related to the captured destination indicia to the control system 100, which in this embodiment may be a PLC. The data may be in the form of input signals from the optical reader 40 representative of the destination indicia captured during scanning.

After receiving data related to the captured destination indicia, the control system 100 (e.g., PLC) determines into which bin the package should be sorted. In one embodiment, the control system (e.g., PLC) matches the destination indicia, which may include a zip code, with a destination location bin within the rack of bins and triggers the visual indicator(s) associated with the appropriate bin (e.g., positioned proximate the bins, on the keypad, etc.). For example, each bin 20 in the rack may be associated with a range of zip codes and the control system 100 (e.g., PLC) identifies the bin associated with the captured destination indicia.

In some embodiments, the control system 100 may send the destination indicia to the carrier system 130 to aid in identifying the appropriate bin. For example, the carrier system 130 may query, using information related to the destination indicia, a database stored within a data repository in which zip codes (or ranges of zip codes) are associated with specific bins. After the bin is identified, this information is communicated to the control system 100, which triggers the appropriate visual indicator(s). In particular embodiments, the control system 100 may trigger illumination of a light associated with a particular key on the keypad to identify the appropriate bin for the operator. For example, if the control system 100 (e.g., PLC) sends a signal that the package should be sorted into bin "4," the signal causes key "4" on the keypad to light. This helps direct the sort operator to the correct bin within the rack of bins.

In place of or in addition to the control system 100 (e.g., PLC) triggering lights on the keypad 30, it may also trigger lights positioned proximate the appropriate bin to aid the sort operator in identifying the proper location for the package. As noted above, suitable visual identifications may include fluorescent lamps, light pipes, fiber optics, or a light at each corner of the bin. At this point in the sorting process, the sort operator is visually alerted as to which bin within the rack of bins the operator should place the package. In response, the sort operator places the package in the correct bin within the rack of bins.

It should be noted that the electronic assignment of locations to the bins may be advantageous in various embodiments. For example, by electronically assigning the locations to the bins, the locations can be easily re-assigned and the sort operator will still be able to properly sort packages into the correct bins with the aid of the control system 100. For instance, the control system 100 and/or the carrier system 130 may be initially programmed to assign certain ranges of zip codes to each bin in the rack of bins for a first group of packages to be sorted. At a later time, a different group of packages going to different locations than the first group of packages may need to be sorted, and as a result, the control system 100 and/or the carrier system 130 may be re-programmed to assign different ranges of zip codes to each bin in the rack of bins. However, as a result of the locations being electronically assigned to the bins in particular embodiments, the sort operator need not be made aware of the location changes with respect to the bins because the operator is led to the correct bin for sorting each package via the keypad and/or bin visual indicator(s). The electronic assignment may be stored locally in association with the control computer 100 (e.g., PLC) or the carrier computer 130.

In particular embodiments, the visual indicators 22 proximate the bins and/or keypad lights may stay lit for a predetermined period of time (e.g., until the next package is scanned, or for a predetermined time duration) to allow the sort operator to place the package in the correct bin or until the sorter logs out of the system. However, in other embodiments, the system may detect when the package has been placed into the appropriate bin and in response deactivate visual indicator(s). In various embodiments, the sort operator may select a particular key on the keypad after having placed the package in the correct bin to signal that the package has been sorted and to deactivate the visual indicator(s). For example, returning to FIG. 5, the sort operator may select the "ENTER" key on the keypad to signal the package has been sorted and to deactivate the visual indicator(s). Alternatively, the visual indicator(s) may be deactivated when a new package is scanned by the optical reader 40.

In other embodiments, the bins 20 may include one or more components that detect when a package has been placed in the bin. For example, in one embodiment, one or more infrared transmitters may be installed in the bar 24 placed in the bin 20 so that the transmitters direct an infrared beam across the opening of the bin 20 to one or more infrared detectors installed in a bar 24 on the opposite side of the bin 20 running parallel to the first bar. Thus, in this instance, when the package is placed in the bin, the infrared beam is broken and the detectors detect the break in the beam. This information may be conveyed to the control system 100 (e.g., PLC) and in response, the control system 100 may deactivate the visual indicator(s) 22 and/or keypad lights.

In particular instances, a package may be initially intended to be shipped to one location and later the shipper may wish to stop shipment of the package. Similarly, in particular instances, a package may be initially intended to be shipped to one location and be rerouted to another location. For example, an online merchant may sell a product to a purchaser and may ship the product to the purchaser's home address. However, during the shipping process, the purchaser may change his mind about purchasing the product and ask for a refund. In this instance, the online merchant may wish to stop the product from being sent to the purchaser's home address and may wish to have the product returned to the online merchant.

To accommodate routing changes, some embodiments may trigger a plurality of lights on the keypad to be lit according to a predetermined pattern. In this way, the system may communicate to the sort operator when such a situation arises for particular packages. For example, one particular signal is shown in FIG. 6. In this particular example, the keypad flashes an "X" by using a combination of keys to signal a routing change or incorrect sorting. For example, the control system 100 (e.g., PLC) may recognize (alone or in conjunction with the carrier system 130) that the destination zip code is not associated with any of the bins associated with the keypad or may receive an indication from the carrier computer 130 that the destination has changed. Therefore, in this instance, the sort operator can set the package to the side so that it may be directed to the correct sorting location sometime later. Other types of patterns may also be used in various embodiments. For example, in one particular embodiment, the keypad may flash an "0" when the optical reader 40 has failed to read the label on a package correctly and/or when the package does not have a label, as shown in FIG. 7. Various embodiments may use other patterns such as an "I" for intercept and/or an "L" to indicate to the operator to logon to the system. Thus, one of ordinary skill in the art can envision various patterns that may be used to signal different situations with respect to packages in light of this disclosure.

2. Retrieving Packages from the Bins

Figure 8:
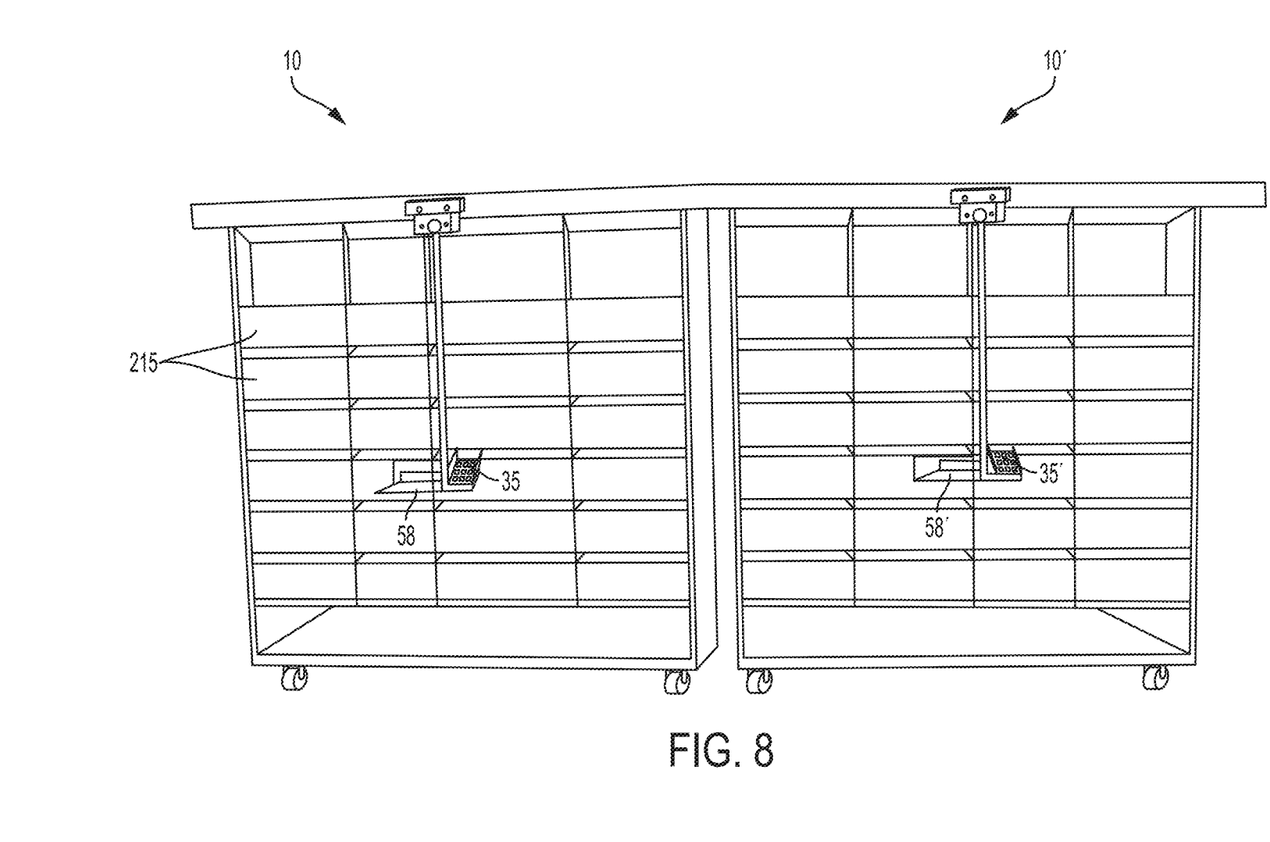
FIG. 8 is a perspective view of the back of sorting bins used in practicing various aspects of the present invention.

In various embodiments, each bin is accessible from the back by a packing operator (e.g., employee of the carrier). As described below, the purpose of the packing operator is to remove packages from the bin and load them into transportation containers. FIG. 8 further illustrates the back of a rack of bins according to an embodiment of the invention. Although FIG. 8 illustrates the back of two joined racks comprising 24 bins each, it should be understood that the rack may include more or less bins. Each rack includes an associated keypad 35, 35' and label printer 58, 58'. The keypad 35 and label printer 58 are supported by a moveable carriage that can travel along the backs of the bins. Keypad 35' and label printer 58' are similarly supported. Keypads 35, 35' are similar to keypads 30 discussed above. For example, the keypads 35, 35' may include keys with associated lights where the numbers on the keys are associated with particular bins. For example, key four represents bin four in the rack of bins. The illustrated embodiment shows two key pads 35, 35' with each keypad associated with 24 bins. Other embodiments may have more or less bins and/or keypads as desired.

In various embodiments, the control system 100 (e.g., PLC) notifies the packing operator that the sort operator has completed sorting the packages and/or that a particular bin is full. For example, in one embodiment, a signaling device may be installed in the packing area that signals to the packing operator that the sort operator has completed sorting the packages such as a light (not shown) that illuminates when the sorted packages are ready to be packed into transportation containers. In other embodiments, the control system 100 will notify the packing operator that the particular bin is full by illuminating the associated key on keypad 35 (or 35').

In various embodiments, the control system 100 (e.g., PLC) triggers illumination of lights associated with specific keys on the keypad that correspond to the bins into which packages have been sorted and which need to be emptied. In these particular embodiments, the packing operator may view the keypad to determine which bins need to be emptied and then place the packages into bags and associate an appropriate label with the bag. In particular embodiments, the sort operator may press a key on the keypad 30, 30' associated with a bin that is full and needs emptying. This is communicated to the control system 100, which triggers illumination of a light on a key on the keypad 35, 35' associated with that same bin. In various embodiments, multiple bins may need emptying at the same time and the control system 100 may blink the light associated with the highest priority bin and the other keys may remain illuminated. Once the highest priority bin is emptied, control system 100 may extinguish the associated light on the keypad 35, 35' and blink the light on the keypad associated with the next bin in queue. In various embodiments, the sort operator may have the ability to change the emptying priority of the bins and move a bin in queue to the top priority by pressing the associated key multiple times. In other embodiments, the control system 100 may set the priority based on any desired criteria such as for example, first-in-first-out or based on the number of packages in the bin.

In addition, the control system 100 (e.g., PLC) may keep track of the number of packages that have been sorted into a particular bin and may compare this number to a predetermined threshold that indicates the bin is full. Thus, if the control system 100 (e.g., PLC) determines the bin is full, the control system 100 (e.g., PLC) triggers lights on the keypad and/or visual indicator(s) around the bin that the bin is full. Note that in particular embodiments, the control system 100 (e.g., PLC) may signal to both the sort operator and the packing operator that the bin is full. As a result, the packing operator can take the necessary steps to empty the bin.

When one or more bins are full and/or the sorting is completed, the packing operator can view the keypad to see which bins need to be emptied. Additionally, the keys on the keypads may be configured to perform certain tasks when selected. For instance, in one embodiment, when a lighted key is pushed, a door 215 pivotably attached to the bottom of the bin may rotate away from the bin opening to allow access to the contents of the bin. More specifically, depressing the key may send a signal to the control system 100 which then deactivates a latch maintaining the door in a closed position. As a result, the door opens. Thus, the packing operator may view a keypad and presses a key with an illuminated light that indicates the corresponding bin has packages. In response, the door pivotably attached to the corresponding bin opens based on a signal from the control system 100 and the packing operator may then remove the packages from the bin and place them into one or more transportation containers. In other embodiments, the door may be manually opened by the packing operator.

In certain embodiments, when selected, the key is also configured to print one or more labels to be placed on the one or more transportation containers. As shown in FIG. 8, a printer 58 may also be installed along with each keypad for the printing of such labels. Thus, in these particular embodiments, the printer may receive information from the control system 100 (e.g., PLC) as to which packages have been sorted into the particular bin and corresponding transportation containers and may print associated information on the labels.

In various embodiments, the packing operator may also scan the label(s) affixed to each of the transportation containers (scanner not shown). In these particular embodiments, the data associated with the transportation container may be stored by the carrier system 130 along with other information. For example, the destination location obtained from the label (s) and the total number of packages placed in the container may be communicated and stored in the carrier system 130. As a consequence, the packages may be linked to the containers within the carrier's systems. Therefore, such information may be used for the purpose of visibility of the packages and tracking subsequent package movement and location.

Once the packing operator has emptied all of the required bins, the packing operator may signal that the bins have been emptied in particular embodiments. For instance, in one embodiment, the packing operator selects a key a keypad that indicates the bins have been emptied. In turn, the sort operator may be alerted to the bins being emptied.

As previously mentioned, in various embodiments, the operation of sorting the packages is automated by a programmable logic control (PLC). The PLC may receive input signals from the optical readers that read alpha-numeric characters, barcode or two-dimensional symbols (such as MaxiCode® symbols) on the packages. Such a symbol may contain address information that allows the PLC and/or other systems of the carrier to determine the appropriate bins into which the packages should be sorted. The PLC, in response to these input signals, sends control signals to the keypad(s) and/or signaling configuration(s) to identify location bins.

Those skilled in the art will understand that the programs, processes, methods, etc. described herein are not related or limited to any particular computer or apparatus. Rather, various types of general purpose machines may be used with programs constructed in accordance with the teaching described herein. Similarly, it may prove advantageous to construct specialized apparatus to perform the method steps described herein by way of dedicated computer systems with hard-wired logic or programs stored in nonvolatile memory, such as read only memory.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for identifying a particular sorting location from a plurality of sorting locations for sorting an item, comprising:
   one or more bins configured to receive sorted items;
   a keypad comprising a plurality of keys, wherein at least one of the plurality of keys is associated with an individual bin of the one or more bins and at least one of the plurality of keys comprises an indicator; and
   a control system configured to:
   receive destination data for the item;
   identify, based at least in part on the received data, a particular sorting location to which the item is to be sorted; and
   upon a determination that the particular sorting location is not a bin within the one or more bins, activate one or more indicators on the keypad.

2. The system of claim 1 further comprising:
   selectively activated visual indicators disposed proximate the plurality of bins,
   wherein the control system is further configured to trigger the visual indicators proximate a particular bin upon a determination that the particular sorting location is the particular bin of the plurality of bins.

3. The system of claim 2, wherein the control system activates an indicator on the keypad associated with a key associated with the particular bin.

4. The system of claim 1, wherein the control system activates a plurality of indicators on the keypad.

5. The system of claim 4, wherein the plurality of activated indicators forms a predetermined pattern.

6. The system of claim 1, wherein the destination data is incomplete or corrupted, and the control system activates a plurality of indicators on the keypad to form a predetermined pattern.

7. The system of claim 1, wherein each of the one or more bins include a first end for receiving items and a second end for retrieving items and the keypad is disposed proximate the first end and the system further comprises a second keypad proximate the second end wherein at least one of the keys on the second keypad is associated with a bin of the one or more bins and at least one of the keys includes an indicator.

8. The system of claim 7 wherein the control system is further configured to:
   determine whether items are present in at least one bin,
   activate an indicator on a key corresponding to the at least one bin to signal a user to retrieve an item from the at least one bin.

9. The system of claim 7, wherein the control system tracks the number of items placed into a particular bin and compares this number to a threshold.

10. A method for identifying a particular sorting location from a plurality of sorting locations for sorting an item, the method comprising the steps of:
    providing one or more bins configured to receive sorted items;
    providing a keypad comprising a plurality of keys, wherein at least one of the plurality of keys is associated with an individual bin of the one or more bins and at least one of the plurality of keys comprises an indicator;
    determining a particular sorting location to which the item should be sorted; and
    upon a determination that the particular sorting location is not a bin within the one or more bins, activating one or more indicators on the keypad.

11. The method of claim 10 further comprising the step of illuminating visual indicators proximate a particular bin upon a determination that the particular sorting location is the particular bin.

12. The method of claim 10, wherein a plurality of indicators are activated on the keypad.

13. The method of claim 12, wherein the plurality of activated indicators form a predetermined pattern.

14. The method of claim 10, wherein each the one or more bins include a first end for receiving items and a second end for removing items and the keypad is disposed proximate the first end, wherein the method further comprises the steps of:
    providing a second keypad proximate the second end wherein at least one of the keys on the second keypad is associated with an individual bin of the one or more bins and at least one of the keys includes an indicator.

15. The method of claim 10, further comprising the steps of:
    determining whether items are present in at least one bin,
    activating an indicator on a key corresponding to the at least one bin to signal a user to retrieve an item from the at least one bin.

16. The method of claim 10, further comprising the step of tracking the number of items placed into a particular bin and comparing this number to a threshold.

* * * * *